C. R. BURNTON.
POST HOLE AUGER.
APPLICATION FILED NOV. 15, 1916.
1,238,388.
Patented Aug. 28, 1917.
2 SHEETS—SHEET 1.
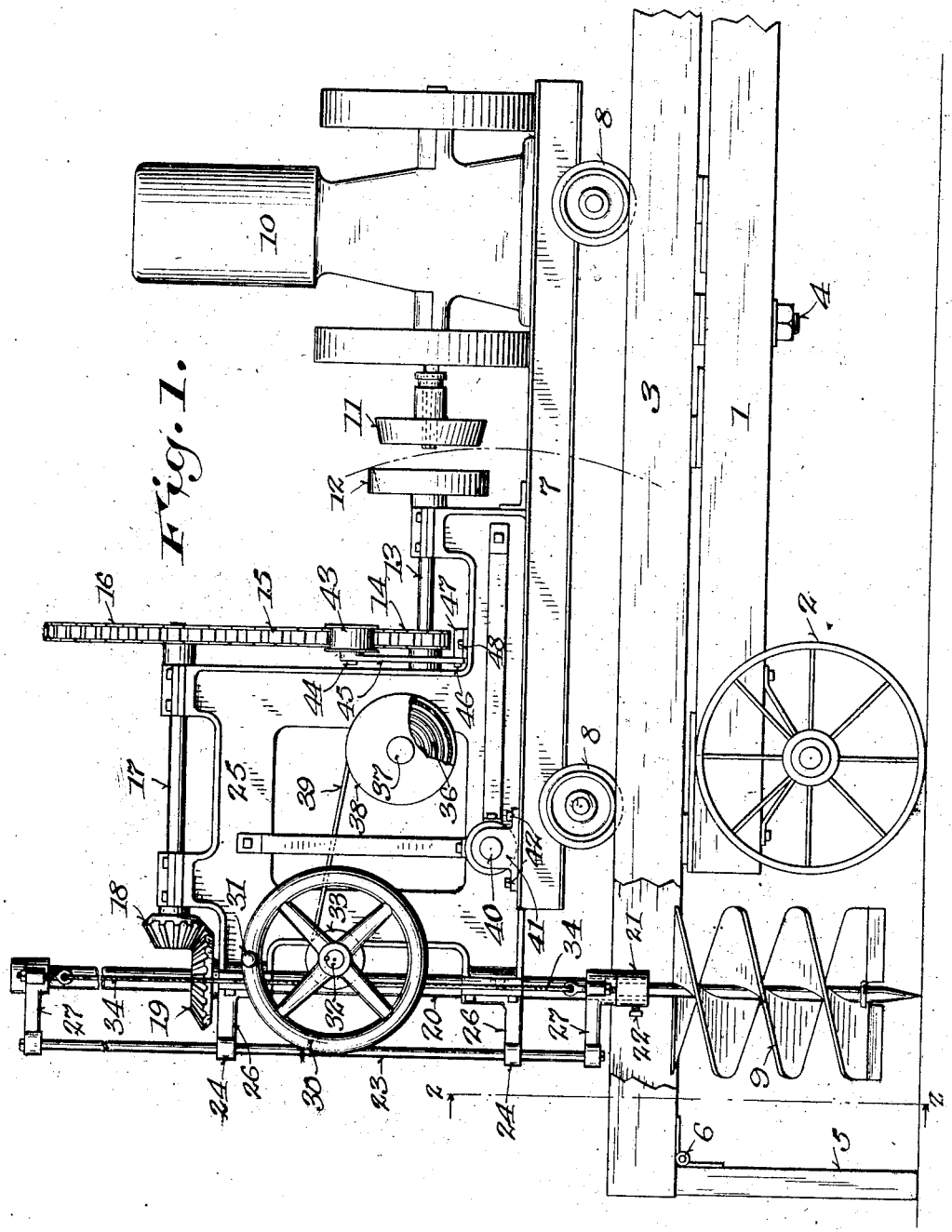

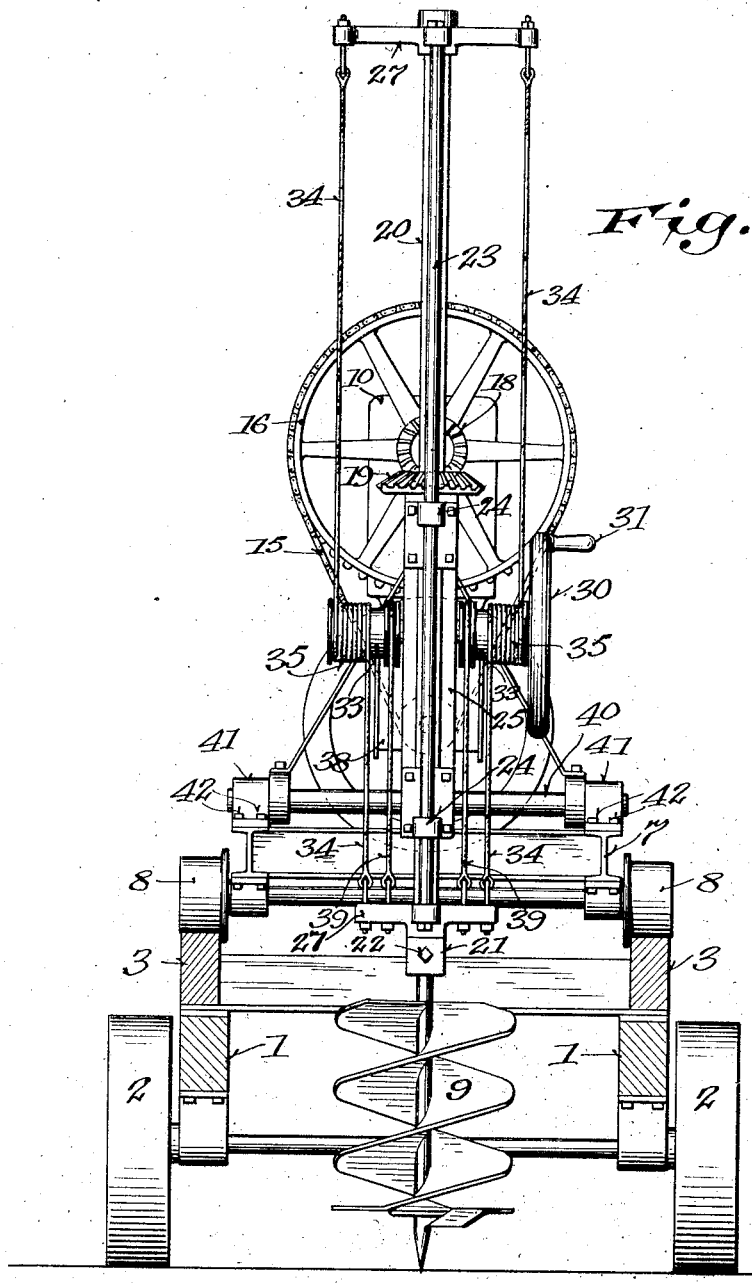

UNITED STATES PATENT OFFICE.

CARROLL R. BURNTON, OF FOND DU LAC, WISCONSIN, ASSIGNOR OF FIFTY ONE-HUNDREDTHS TO MAX C. SEVERIN, OF MILWAUKEE, WISCONSIN.

POST-HOLE AUGER.

1,238,388.  Specification of Letters Patent.  Patented Aug. 28, 1917.

Application filed November 15, 1916. Serial No. 131,415.

*To all whom it may concern:*

Be it known that I, CARROLL R. BURNTON, a citizen of the United States, residing at the city of Fond du Lac, county of Fond du Lac, and State of Wisconsin, have invented new and useful Improvements in Post-Hole Augers, of which the following is a specification.

My invention relates to post hole augers, and it pertains, among other things, first to the device for pivotally supporting the auger and mechanism for driving the same from a movable truck, whereby said auger and connecting mechanism independently of its driving motor is adapted to be partially inverted upon pivotal supports, whereby the same may be more easily moved when desirous to transport said machine from one place to another. Second, to the device for counteracting the weight of the drill and connecting mechanism, whereby the same is adapted to be more easily raised and lowered as may be required when using the machine; and third, to the general construction and arrangement of the several coöperating parts, whereby the device is not only simplified in construction but is better adapted to the uses for which it is intended.

My invention is further explained by reference to the accompanying drawings, in which—

Figure 1 represents a side view, part broken away to disclose the mechanism for operating the earth removing device, and Fig. 2 is an end view, drawn on line 2, 2 of Fig. 1.

Like parts are identified by the same reference numerals throughout both views.

1 represents the primary truck which is adapted to be moved upon the surface of the ground. The truck 1 is provided with the ordinary wheels 2 at its respective ends, whereby the same is readily conveyed from place to place, one pair of wheels 2 not being shown. Mounted upon the truck 1 is a frame 3 which is revolubly connected therewith by a bolt 4, whereby the auger may be swung toward the right and left and thus brought to the desired position. The frame 3 is preferably provided with a plurality of legs 5 which are connected therewith by hinges 6 which permit said legs to be folded parallel to the frame 3 when the truck is moved.

When, however, the device is used the legs 5 are preferably turned down, as indicated in Fig. 1, so that their lower ends are adapted to rest upon the ground whereby the device is given greater stability. Mounted upon the upper side of the frame 3 is a secondary truck 7, which is provided at its respective ends with a pair of wheels 8, 8 which permit of the auger and connecting mechanism being moved slightly forwardly and backwardly without moving the main truck 1, whereby the auger 9 is brought to the desired place for boring a hole. The auger 9 is of ordinary construction, and the same is revolubly connected with a motor 10 when in a vertical position of ordinary construction. The motor 10 is adapted to be connected with the driving mechanism of the auger when the auger is in the vertical position shown in Fig. 1 through the coupling members 11 and 12, the coupling member 11 being preferably conical in shape and brought into impinging contact with the inner wall of the coupling member 12 by moving the same forwardly on the supporting shaft, whereby motion is communicated from the motor to said auger when the latter is in the vertical position shown through the shaft 13, sprocket wheel 14, sprocket chain 15, sprocket wheel 16, shaft 17, miter gears 18 and 19 and shaft 20, said shaft 20 being connected with the auger 9 by the sleeve 21 and set screw 22, or in any convenient manner.

The shaft 20 is strengthened and reinforced by the side shaft 23, which shaft 23 has sliding bearings in the several sleeves 24, which sleeves 24 are connected at their opposite ends with the main frame 25 through the stationary arms 26, 26, and is connected with the auger supporting shaft 20 by the arms 27, 27, which arms 27, 27 are adapted to move upwardly and downwardly with the rod 23 and the auger 9. The auger 9 is raised and lowered by revolving the wheel 30, said wheel being provided with a handle 31 by which it is turned. Said wheel is mounted upon the shaft 32, which shaft 32 is in turn surrounded by the cylindrical member 33 of greater diameter. An upward and downward movement is communicated to the auger 9 and its supporting shaft 20 from the cylinder 33 through the cables 34, 34, which cables are wound several times around the cylindrical member 33, as shown at 35 in Fig. 2.

Thus, it is obvious that as said wheel 30 is revolved in one direction said auger will be raised and will be lowered by revolving said wheel in the opposite direction. The auger 9 and the other coöperating parts are counterbalanced by the resilient action of the spring 36, and said spring 36 is revolubly supported from the shaft 37 and is inclosed within the drum 38, said drum being connected with the cylindrical member 33 through one or more cables 39, whereby it becomes comparatively easy to raise and lower said auger, said spring being wound up with the downward movement of the auger while the weight of the auger is counteracted by the recoil of said spring, it being, of course, understood that said spring is simply auxiliary and that the movement of the auger is controlled by revolving the wheel 30 forwardly and backwardly.

The frame 25, auger 9, and the movable mechanism connected with said auger are all supported from the frame 7 by the pivotal shaft 40, and said pivotal shaft 40 is connected with said frame 7 at its respective ends through the journal bearings 41, said journal bearings being secured to said frame 7 by the bolts 42. 43 is an idler which is adapted to bear against the side of the sprocket chain 15, said idler 43 is connected with the frame 25 through the bolt 44, arm 45, bolt 46, bracket 47 and bolt 48, whereby such slack, if any, as may occur in said sprocket chain may be taken up.

It will, of course be understood that I do not wish to confine or limit myself to any particular style of motor for driving the mechanism described or to any particular style of truck for supporting the same.

Having thus described my invention what I claim as new and desire to secure by Letters Patent, is:—

1. In a device of the described class, the combination of a truck, a frame longitudinally movable on said truck, a supporting frame pivoted on said movable frame, a post hole auger and connecting mechanism carried by said supporting frame, and driving mechanism mounted on said movable frame for driving said auger and connecting mechanism when the latter are in horizontal position.

2. In a device of the described class, the combination of a truck, a frame adapted to be moved longitudinally on said truck, a post hole auger and connecting mechanism pivotally supported from said frame, whereby the same is adapted to be inclined toward the horizontal for transportation, means for counterbalancing the weight of said auger, and means on said frame for driving said auger through said connecting mechanism.

3. The combination of a truck, a frame supported from said truck, a set of supporting wheels interposed between said frame and truck, a post hole auger, a frame for supporting said auger from said first named frame, means for pivotally supporting said second frame from said first named frame, driving mechanism, a coiled spring for counterbalancing the weight of said auger, whereby the same may be easily raised and lowered by the operator, and means carried by said first named frame for communicating a revoluble movement to said auger when the latter is in a vertical position.

In testimony whereof I affix my signature in the presence of two witnesses.

CARROLL R. BURNTON.

Witnesses:
R. F. ELDRED,
ELLA BERRY.